(12) United States Patent
Cai et al.

(10) Patent No.: US 10,795,342 B1
(45) Date of Patent: Oct. 6, 2020

(54) PROXIMITY DETECTION IN ASSEMBLY ENVIRONMENTS HAVING MACHINERY

(71) Applicant: The Boeing Company, Chicago, IL (US)

(72) Inventors: Fei Cai, Edmonds, WA (US); Farahnaz Sisco, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/683,039

(22) Filed: Nov. 13, 2019

Related U.S. Application Data

(63) Continuation-in-part of application No. 16/372,306, filed on Apr. 1, 2019.

(51) Int. Cl.
| | | |
|---|---|---|
| *G08B 13/00* | (2006.01) | |
| *G05B 19/418* | (2006.01) | |
| *B64C 1/06* | (2006.01) | |
| *G06F 1/16* | (2006.01) | |
| *G05B 19/042* | (2006.01) | |

(52) U.S. Cl.
CPC .............. *G05B 19/418* (2013.01); *B64C 1/06* (2013.01); *G05B 19/0428* (2013.01); *G06F 1/163* (2013.01)

(58) Field of Classification Search
CPC .... G05B 19/418; G05B 19/0428; B64C 1/06; G06F 1/163
USPC ........................................................ 340/541
See application file for complete search history.

(56) References Cited

U.S. PATENT DOCUMENTS

| | | |
|---|---|---|
| 7,890,194 B2 | 2/2011 | Pannese |
| 9,792,746 B2 | 10/2017 | Brunner |
| 2007/0205861 A1 | 9/2007 | Nair et al. |
| 2008/0018472 A1 | 1/2008 | Dasilva et al. |
| 2008/0256131 A1 | 10/2008 | Shimohara |
| 2009/0072631 A1 | 3/2009 | Iida et al. |
| 2014/0130645 A1 | 5/2014 | Takano et al. |

(Continued)

FOREIGN PATENT DOCUMENTS

| | | |
|---|---|---|
| CA | 2894306 A1 | 1/2016 |
| EP | 1479964 A2 | 11/2014 |

(Continued)

OTHER PUBLICATIONS

Inertial measurement unit; Wikipedia; Aug. 26, 2019.

(Continued)

*Primary Examiner* — Tanmay K Shah
(74) *Attorney, Agent, or Firm* — Duft & Bornsen, PC

(57) ABSTRACT

Systems and methods are provided for proximity detection in a fabrication environment. One embodiment is a method for reporting proximity in an assembly environment. The method includes inserting an arm of a bracket into an interior of a part that is held by a cradle, and that is worked upon by a robot, placing indexing features at the bracket into contact with indexing features of the cradle, operating sensors at the bracket to directly detect a location of a first proximity detector worn by a technician and a location of the second proximity detector at the robot, and directing the first proximity detector to provide a warning to the technician if a distance between the first proximity detector and the second proximity detector is less than a threshold.

23 Claims, 10 Drawing Sheets

(56) References Cited

U.S. PATENT DOCUMENTS

| | | | |
|---|---|---|---|
| 2016/0046393 A1* | 2/2016 | Frauen | B25J 5/02 29/428 |
| 2016/0202692 A1 | 7/2016 | Patel et al. | |
| 2016/0270574 A1 | 9/2016 | Dekar | |
| 2016/0274586 A1 | 9/2016 | Stubbs et al. | |
| 2017/0057080 A1* | 3/2017 | Krohne | B25J 9/0084 |
| 2017/0148116 A1 | 5/2017 | Grossman et al. | |
| 2017/0151577 A1 | 6/2017 | Baltz et al. | |
| 2017/0151668 A1* | 6/2017 | Boesen | B25J 19/061 |
| 2017/0369288 A1 | 12/2017 | Fulton et al. | |
| 2019/0026930 A1 | 1/2019 | Kritzler et al. | |

FOREIGN PATENT DOCUMENTS

| | | |
|---|---|---|
| EP | 3354412 A1 | 8/2018 |
| JP | 2016198839 A | 12/2016 |

OTHER PUBLICATIONS

Ultra-wideband; Wikipedia; Aug. 26, 2019.

U.S. Appl. No. 16/372,306, filed May 26, 2017, to Allen Halbritter et al.

European Search Report; Application EP20163021; dated Aug. 7, 2020.

European Search Report; Application EP20163027; dated Aug. 13, 2020.

Gil P. et al; A Cooperative Robotic System Based on Multiple Sensors to Construct Metallic Structures; Mar. 18, 2009.

European Search Report; Application EP20163025; dated Aug. 12, 2020.

Laoudias, Christos et al; A Survey of Enabling Technologies for Network Localization, Tracking, and Navigation; Ieee communications Surveys & Tutorials, vol. 20, No. 4, Fourth Quarter 2018.

* cited by examiner

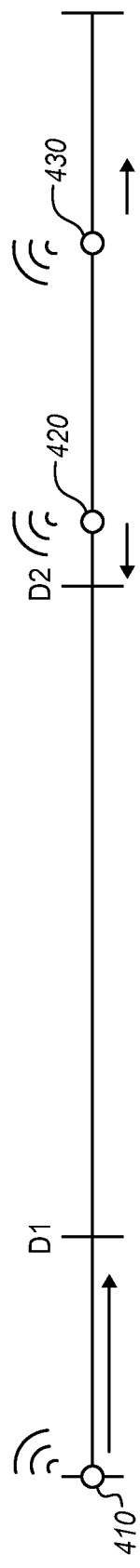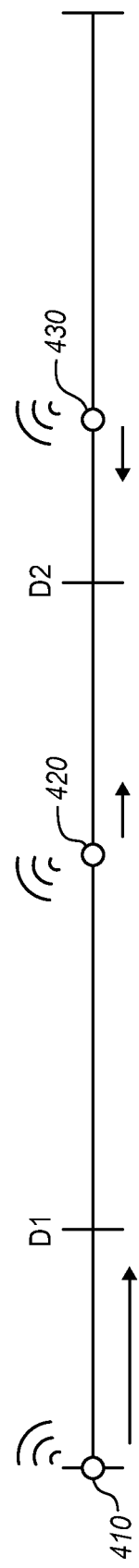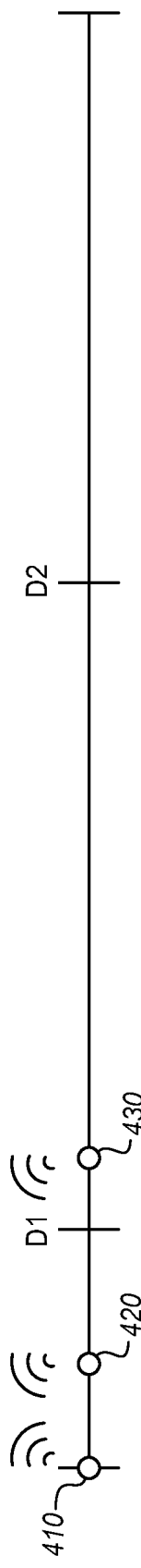

FIG. 7

| MASTER ID | 0078 |
|---|---|
| DEVICE ID | 0001 |
| BATTERY LEVEL | 85 |

FIG. 8

| MASTER ID | 0078 |
|---|---|
| DEVICE | 0001 |
| INSTRUCTION | WARN |

PROXIMITY DETECTION IN ASSEMBLY ENVIRONMENTS HAVING MACHINERY

FIELD

The disclosure relates to the field of assembly, and in particular, to human-machine interactions in an assembly environment.

BACKGROUND

In an assembly environment, it remains desirable to assemble new parts as quickly and efficiently as possible. It is not uncommon for certain assembly tasks to be performed by automated machines, while other assembly tasks are performed by human technicians. To ensure safety, technicians are restricted from entering zones of operation of the automated machines while the automated machines are operating. This results in "stayout zones" that may reduce the speed and efficiency at which the technicians operate, and may result in slower assembly rates, which are undesirable. At the same time, it remains best practice not to rely on operator awareness of nearby automated machines or otherwise allow automated machines to operate in unison with technicians in the same zone. Hence, automated machines and technicians are restricted to separate times of use if they both will be utilizing the same zone.

Further complicating this issue, it may be difficult to determine whether a technician is present in a zone if the technician is obscured by large parts being worked upon within the zone. For example, a composite part for a wing or fuselage of an aircraft spans many feet, and hence is capable of blocking the technician from view.

Therefore, it would be desirable to have a method and apparatus that take into account at least some of the issues discussed above, as well as other possible issues.

SUMMARY

Embodiments described herein dynamically sense the proximity of a technician to a machine via multiple sensors that interact with proximity detectors at the machine and the technician. These sensors are capable of operating in different detection modes (e.g., by utilizing different timing windows or methods of detection) based on whether or not a part is being worked upon in a zone occupied by the technician.

One embodiment is a method for reporting proximity in an assembly environment. The method includes inserting an arm of a bracket into an interior of a part that is held by a cradle, and that is worked upon by a robot, placing indexing features at the bracket into contact with indexing features of the cradle, operating sensors at the bracket to directly detect a location of a first proximity detector worn by a technician and a location of the second proximity detector at the robot, and directing the first proximity detector to provide a warning to the technician if a distance between the first proximity detector and the second proximity detector is less than a threshold.

A further embodiment is a non-transitory computer readable medium embodying programmed instructions which, when executed by a processor, are operable for performing a method for reporting proximity in an assembly environment. The method includes inserting an arm of a bracket into an interior of a part that is held by a cradle, and that is worked upon by a robot, placing indexing features at the bracket into contact with indexing features of the cradle, operating sensors at the bracket to directly detect a location of a first proximity detector worn by a technician and a location of the second proximity detector at the robot, and directing the first proximity detector to provide a warning to the technician if a distance between the first proximity detector and the second proximity detector is less than a threshold.

A further embodiment is a system for proximity reporting in an assembly environment. The system includes a first proximity detector that is wearable, a second proximity detector that is disposed at a robot in a cell of the assembly environment, a cradle that holds a part having an interior, the cradle including indexing features, and a bracket. The bracket includes a base having indexing features that mate with the indexing features of the cradle, an arm inserted into the interior of the part, and multiple sensors disposed at the arm.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 4-6 depict distances between proximity detectors in an illustrative embodiment.

FIGS. 7-8 illustrate communications transmitted between proximity detectors and a proximity reporting server in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
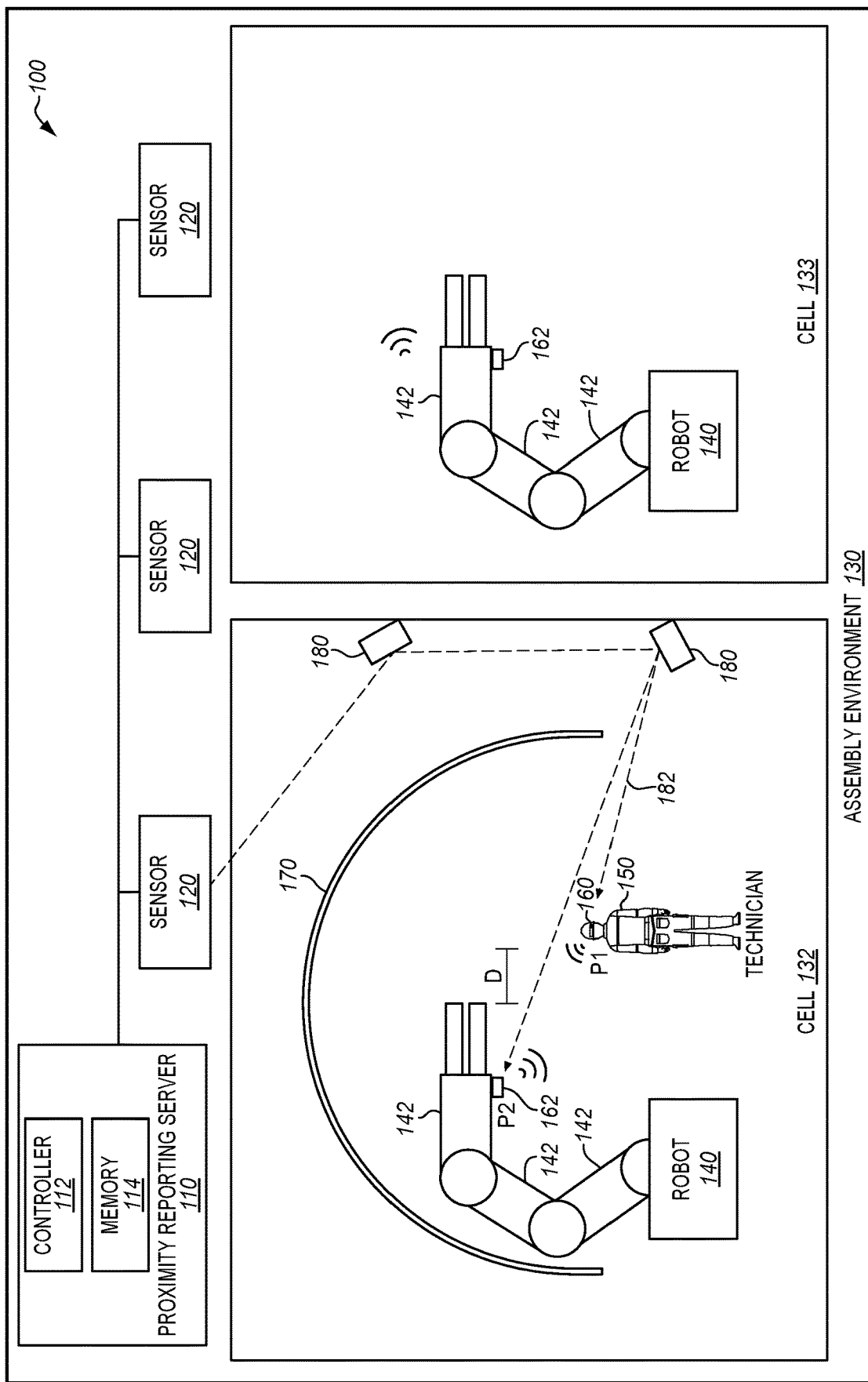
FIG. 1 illustrates a proximity reporting system in an illustrative embodiment.

FIG. 1 is a diagram of proximity reporting system 100 in an illustrative embodiment. Proximity reporting system 100 comprises any system operable to dynamically determine distances between proximity sensors within an assembly environment, and to change detection modes/heuristics based upon whether a part is located in a cell. Proximity reporting system 100 has been further enhanced to distinguish between technicians and machines, and to provide warnings and/or other mitigation based on distances between technicians and machines. This provides a technical benefit by ensuring the safety of technicians who work near machines, while also increasing the up-time of machines within a cell. It also ensures that parts in a cell do not obscure a technician from detection. As used herein, a "cell" comprises any dedicated workspace or volume in which one or more machines/machines are intended to operate.

In this embodiment, proximity reporting system 100 includes proximity reporting server 110, and sensors 120 (e.g., radio antennae, Ultra-Wideband (UWB) transceivers, cameras, etc.). Sensors 120 receive input from proximity detectors 160, which are disposed within one or more of cells 132-133 of an assembly environment 130 (e.g., a factory floor), and hence sensors 120 operate as an interface of proximity reporting server 110. The controller 112 reviews Ultra-Wideband (UWB) input from the sensors. Proximity detectors 160 are capable of being worn by one or more technicians 150, and also may be disposed at portions 142 (e.g., moving components) of machines 140. Machines 140 may comprise robotic arms, Automated Guided Vehicles (AGVs), flex track machines and other automated devices that move within a cell. As depicted, a technician 150 is wearing a proximity detector 160 at a first position P1 within the cell 132, and is at a distance/proximity D to a machine 140 having a proximity detector 162 at a second position P2 within the cell 132. The proximity detector 162 may be located at a moving portion of the machine 140, a base of the machine 140, end effectors at the machine 140, etc. Furthermore, as depicted, there is presently no technician or proximity detector within cell 133.

Based on signals from proximity detectors 160 and 162, controller 112 of proximity reporting server 110 determines the location of each proximity detector 160 and 162. If proximity detectors 160 for one or more technicians are closer than predefined thresholds stored in memory 114 to a proximity detector 162 at a machine 140, then controller 112 may provide a warning. Controller 112 may be implemented, for example, as custom circuitry, as a hardware processor executing programmed instructions, or some combination thereof.

In order to account for the presence of an obscuring object 170 (e.g., a section of fuselage, a wing panel, etc.) that may block line of sight to a proximity detector (and therefore prevent detection of the technician or machine), one or more of mirrors 180 are placed in order to form a detection pathway 182. The mirrors 180 are capable of reflecting wavelengths of electromagnetic radiation utilized by the sensors 120. Thus, in embodiments where the sensors comprise cameras, the mirrors 180 reflect optical wavelengths. In embodiments where the sensors detect radio wavelengths, the mirrors 180 are capable of reflecting radio wavelengths. As used herein, a mirror is "capable of reflecting" if it redirects a signal without substantially attenuating the signal (e.g., by more than ten percent, by more than one percent, etc.).

The proximity reporting system 100 (e.g., proximity reporting server 110) is configured to adjust a sensing heuristic in response to the presence of an obscuring object 170 in the cell 132. In this manner, the sensors 120 are able to detect a technician with signaling passed via the mirrors 180 along the detection pathway 182. The presence of an object may be automatically detected by the sensors, or may be indicated by input provided to controller 112 from an external source.

For sensors 120 that are omnidirectional, the change in sensing heuristic can comprise adjusting a timing window in which input is acquired (i.e., to account for an increased input delay owing to increased path length caused by the mirrors). That is, in one embodiment, an increase in path length results in a corresponding delay, and a sampling window for detecting input via a sensor 120 is moved in time by an amount equal to the delay. This change to sampling window timing varies between sensors 120, but is known based on the positions and orientations of the mirrors 180 with which each sensor 120 interacts. For sensors 120 that are directional and are capable of adjustment to point in new directions, the change in sensing heuristic may comprise pointing the sensor 120 at a mirror 180 in order to receive signaling from the detection pathway 182. In one embodiment, a limited number of sensors adjust their sensing heuristic. The number is chosen to ensure that the technician remains detectable by at least three sensors at once from any location behind the obscuring object 170, thereby enabling triangulation of position (after transforming received signal timings to account for the difference in path caused by the mirrors). This enables the technician 150 to remain detected while moving within the cell 132, which is highly desirable.

Stated succinctly, the machines 140 and technicians 150 are equipped with transceivers to communicate their locations, and these locations may be compared to each other. Based on this comparison, different levels of warning/ remediation are provided (e.g., to warn humans and/or shutdown machines) in order to ensure safety when humans and machines work together in the same cell/zone. The use of mirrors 180 ensures that the proximity reporting techniques and systems discussed herein remain effective regardless of whether an obscuring object is present or not.

Illustrative details of the operation of proximity reporting system 100 will be discussed with regard to the flowchart of FIG. 2. Assume, for this embodiment, that a technician 150 of FIG. 1 is planning on entering a cell 132 where machines 140 are presently operating. For example, the machines may be assembling/joining composite parts and/or metal parts for use in an aircraft.

Figure 2:
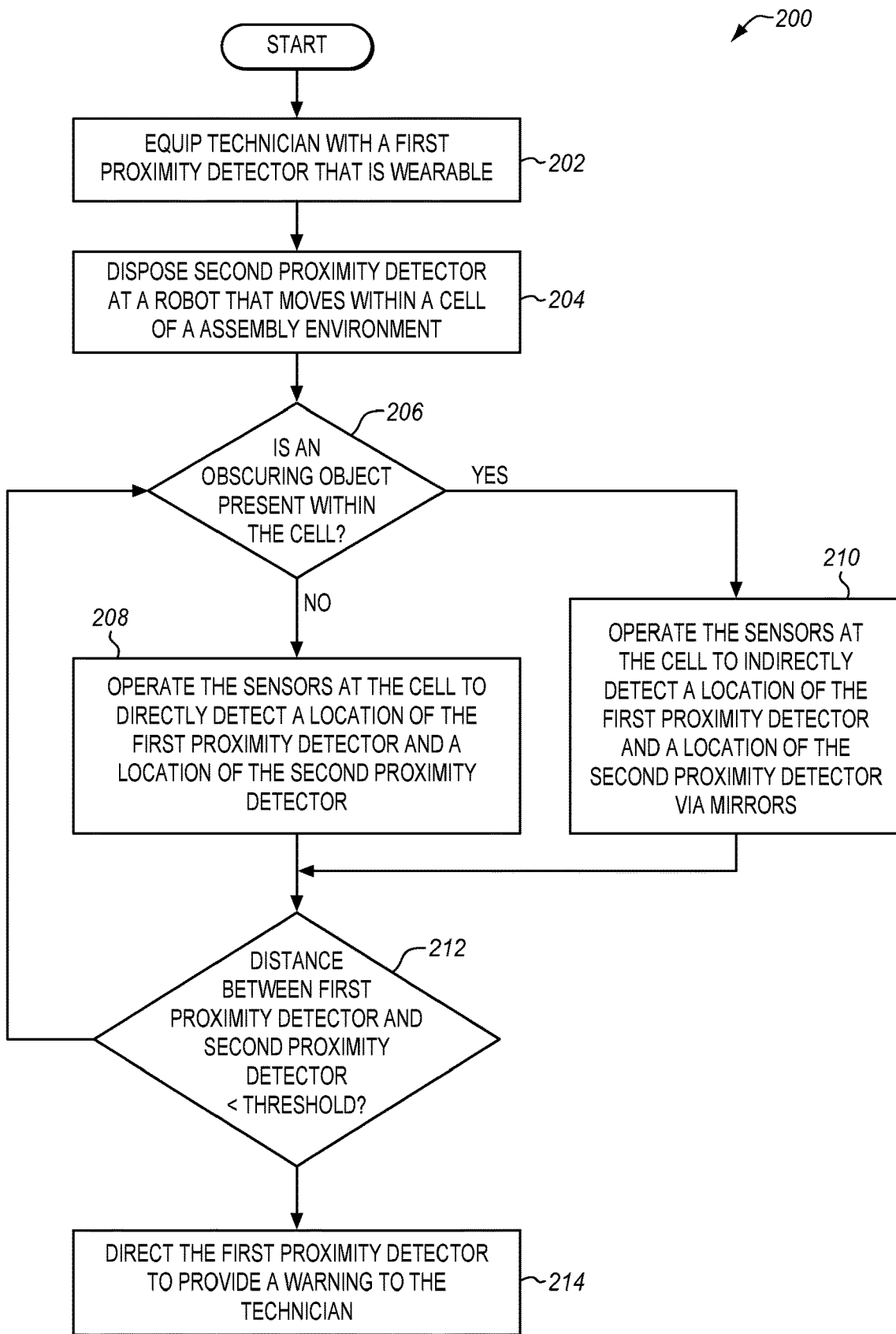
FIG. 2 is a flowchart illustrating a method for reporting proximity in an illustrative embodiment.

FIG. 2 is a flowchart illustrating a method 200 for reporting proximity in an illustrative embodiment. The steps of method 200 are described with reference to proximity reporting system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, a technician 150 is equipped with a first proximity detector (e.g., one or more of proximity detectors 160). The first proximity detector is wearable in that it may be carried on the technician in a hands-free manner. For example, the proximity detector may be added to headwear (e.g., a helmet) of the technician, may be equipped by hook-and-loop fastener (e.g., Velcro) fabric to clothing worn by the technician 150, may be placed in a pocket of the technician, may be in the form of a pendant or smart wrist watch worn by the technician 150, may be sewn or bonded to clothing worn by the technician 150, may be implemented as smart safety glasses that provide visual, audio or vibratory warnings or any combination thereof, or may be equipped via other means. In further embodiments, the first proximity detector comprises a cellular phone or tablet, and may utilize technology such as Global Positioning System (GPS) technology.

In step 204, a second proximity detector is disposed at a portion 142 of a machine 140 that moves within assembly environment 130. This may comprise affixing multiple proximity detectors 162 at (e.g., disposed on or within) each machine 140 within the cell, and may be performed during initial setup and calibration of the machines 140 before maintenance or inspection is desired. In some embodiments, the second proximity detector (i.e., proximity detector 162) is coupled with the power supply of the machine 140, and communicates with a controller of the machine 140. With the first proximity detector (i.e., proximity detector 160) and second proximity detector (i.e., proximity detector 162) in place, the technician 150 proceeds into the cell 132 (e.g., to perform inspections, assist with assembly or maintenance). During this time, machines 140 within the cell 132 may continue to operate. However, the machines are not required to be in continuous motion during placement of the second proximity detector, nor during use of the proximity detectors. Rather, the proximity detectors are capable of detecting a position of a machine both during operation of the machine and during pauses in operation of the machine.

In step 206, a controller 112, determines whether an obscuring object 170 (e.g., a part being worked upon in the cell, such as a section of fuselage or a wing) is present within the cell. In one embodiment, controller 112 determines whether the obscuring object 170 is present based on a review of a Numerical Control (NC) program directing the actions of the machine 140. If the current NC program for the machine 140 is directed to performing work on the obscuring object, then controller 112 infers that the obscuring object 170 is present (i.e., because it is currently being worked upon by a machine in the cell). In a further embodiment, the controller 112 infers the presence of the obscuring object 170 based on input provided directly by the technician 150, or based on input from the sensors 120. For example, when the cell 132 is utilized to perform work on a limited selection of parts that each have an expected orientation, the sensors 120 detect the presence of an obscuring object 170 directly based input from the sensors 120, such as based on sensor readings indicative of the obscuring object 170 being located within the cell 132. For example, a sensor 120 may utilize a laser or acoustic sensor to measure a distance beneath it. If the distances measured by multiple sensors are less than a known distance to the floor, then an obscuring object 170 is present. In a further embodiment, a sensor 120 in the form of a camera is utilized for the purpose of detecting the presence of the obscuring object.

Step 208 includes operating the sensors 120 at the cell 132 to directly detect a location of the first proximity detector and a location of the second proximity detector when the obscuring object 170 is not present. In one embodiment, the first proximity detector transmits a first signal to sensors 120 in the assembly environment 130 (e.g., sensors 120 disposed outside of the cell 132, inside of the cell 132, at the machine 140, etc.). The first signal is received at the sensors 120 directly from the first proximity detector (i.e., without reflecting off of mirrors 180).

In this embodiment, the first signal comprises an Ultra-Wideband (UWB) radio signal that provides a unique identifier for the first proximity detector that distinguishes it from other proximity detectors 160 and 162 in assembly environment 130. The first proximity detector may be associated with a specific technician indicated in memory 114 of proximity reporting server 110. In a further embodiment, the first signal also explicitly recites the technician or machine to which the first proximity detector is attached. In still further embodiments, the first signal is transmitted over multiple different radio bands or channels of communication. The first signal may even be transmitted via a Light Emitting Diode (LED) as a visual code in certain embodiments. Transmitting the first signal via multiple distinct channels of communication provides a technical benefit of ensuring that the signal can be received and processed by sensors 120. The first signal may be transmitted continuously or periodically (e.g., once or multiple times per second).

The second proximity detector (i.e., proximity detector 162) transmits a second signal to the sensors 120. The second signal is received at the sensors 120 directly from the second proximity detector (i.e., without reflecting off of mirrors 180). The second signal uniquely identifies the second proximity detector, and may be transmitted via the same channels and in a similar manner to the first signal. The first signal and the second signal are received at sensors 120, and the signals are provided to proximity reporting server 110 for analysis. Next, the controller 112 may perform triangulation to determine the locations of the proximity detectors, and may apply desired transformations to timing and/or coordinate systems to account for the use of mirrors by one or more of the sensors 120.

At some point in time, the obscuring object 170 is added to the cell 132, which causes technicians entering the cell 132 to be obscured from direct view when occupying certain locations. This condition is detected by controller 112.

Step 210 includes operating the sensors 120 at the cell 132 to indirectly detect the location P1 of the first proximity detector and the location P2 of the second proximity detector via mirrors 180 when the obscuring object 170 is present. This may comprise pointing the sensors 120 towards one or more of the mirrors 180 in embodiments where the sensors are directional. In one embodiment, the sensors interact with the mirrors such that at least three distinct pathways are provided to each location in order to enable triangulation. Indirect detection may further comprise altering a sensing heuristic for the sensors 120 in embodiments where the sensors are omnidirectional. For each sensor, there is an expected maximum distance of detection and minimum distance of detection, which corresponds with a sampling window in which input is from the sensor 120 is reviewed. Signaling traversing the detection pathway 182 alters (e.g., increases) the minimum and maximum distances of detection, which in turn alters (e.g., increases) the timing at which incoming signaling is expected. Thus, a sampling window in which signals are acquired for analysis may be adjusted by an amount equal to the change in expected signaling timing. Based on received signaling, a location of the first proximity detector and a location of the second proximity detector is determined (e.g., via triangulation).

With the locations of the proximity detectors known, the controller 112 determines a distance between the proximity detectors in step 212. This may be performed by consulting information stored in memory 114 indicating a position of each sensor, triangulating a first position P1 of the first proximity detector and a second position P2 of the second proximity detector based on the strength of signals received at each sensor 120, and determining an amount of separation between the first position and the second position. Memory 114 may store signals from the sensors 120 as a part of this process. In further embodiments wherein the sensors 120 comprise cameras, the angle of each camera, and stereoscopic equipment or techniques may be used in order to determine position. In further embodiments, controller 112 may select which proximity detectors to determine distances between. For example, controller 112 may selectively forego distance determinations between proximity detectors located on technicians, proximity detectors located on the same entity (e.g., the same technician, the same machine, etc.), proximity detectors located on machines (e.g., in circumstances where existing collision avoidance technologies for the machines already prevent collisions), etc. This may enable greater allocation of resources for controller 112 to perform distance determinations which are most relevant (i.e., most likely to enhance safety). In still further embodiments, motion detection techniques may be used on distance data acquired over time to determine the current speed and/or direction of a technician or machine. Once the distance has been determined, the distance is compared to a threshold. If the distance is not less than the threshold (e.g., a distance at which a safety warning will be provided to the technician, or a distance at which the machine will be halted to ensure safety) then processing continues to step 206, and the system determines new locations of the proximity detectors. Alternatively, if the distance is within the threshold, processing continues to step 214.

Step 214 includes directing the first proximity detector to provide a warning to the technician if a distance between the first proximity detector and the second proximity detector is less than a threshold. The distance thresholds described herein (and illustrated in FIGS. 4-6) may be statically defined on a per-machine basis, or may be dynamically determined based on movements indicated in an NC program for the machine, and/or a position of the machine within the NC program as the machine continues to operate. For example, if a path of a machine in the future is expected to cause the machine to reduce its distance to a technician, the threshold may be increased to ensure that a warning is issued more quickly.

In one embodiment, if the distance is not less than a first threshold, then the technician 150 is far away from the machine 140. Therefore, the machine 140 may continue operations. Alternatively, if the distance is less than the first threshold, controller 112 directs the first proximity detector (e.g., via sensors 120) via detection pathway 182 to provide a warning to the technician 150. That is, the warning is provided through the detection pathway 182. Specifically, a transmission provided across the detection pathway 182 causes the first proximity detector to alert the technician via any suitable means (e.g., visual means, auditory means, vibratory means, etc.). The operating environment within the cell 132 may include visual, auditory, and/or other stimuli that may dull the senses of the technician 150. Therefore, the warning may be generated to stimulate multiple senses (e.g., via bright light, vibratory motion, and or distinctive sounds). The warning may even take the form of a verbal warning stating "halt movement forward," "do not move to the left," "do not move south," or similar phrases, depending on the location of the technician relative to the machine. The warning is a cue for the technician 150 that encourages increased awareness and caution. In further embodiments, the warning may be implemented in the form of a flashing light on the helmet, glasses, or gloves of the technician, or as a flashing light or siren at the machine.

If the distance between the first proximity detector and the second proximity detector is less than a second threshold, then the controller 112 directs the machine 140 to halt. This provides a technical benefit by ensuring that the technician remains safe, even when they move close to an actively operating machine. This also provides a technical benefit because it does not require each machine to include its own dedicated technician avoidance sensors and logic.

Method 200 may be performed for multiple sets of proximity detectors substantially concurrently and asynchronously. For example, method 200 may be performed to determine additional distances between the proximity detector of the technician and proximity detectors at additional machines. This enables proximity detection to be performed for all relevant entities within a manufacturing cell, or even across an entire factory floor. Method 200 further provides a technical benefit by preventing obscuring objects, such as large parts, from rendering a technician undetectable. Method 200 further provides a technical benefit by enabling compliance with Robotic Industries Association (RIA) standards (e.g., RIA 15.06).

Figure 3:
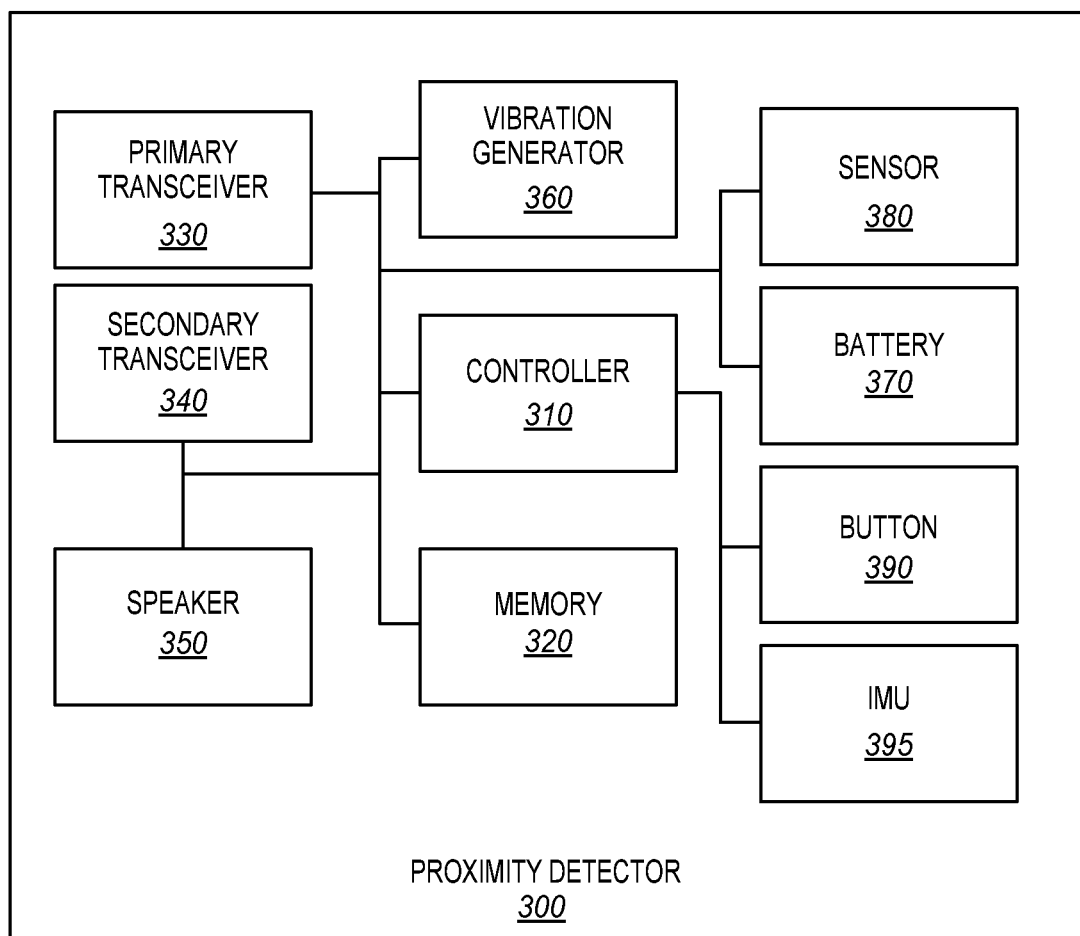
FIG. 3 is a diagram of a proximity detector in an illustrative embodiment.

FIG. 3 is a diagram of a proximity detector 300 in an illustrative embodiment. Proximity detector 300 includes a controller 310, memory 320, and a primary transceiver 330 as well as a secondary transceiver 340. Primary transceiver 330 and secondary transceiver 340 operate using different frequency ranges (or modalities of communication, such as optical vs. radio) in order to transmit a signal from proximity detector 300. Thus, if one frequency range experiences interference or noise, the other transceiver may still provide the signal at another frequency range. Proximity detector 300 also includes vibration generator 360 (e.g., a piezoelectric element, a vibrational motor, etc.), and speaker 350. When generating a warning, controller 310 may activate one or both of these elements to draw the attention of a technician. In further embodiments, proximity detector 300 may generate an alert at eyewear worn by the technician 150 to cause flashing lights, other visual input, or vibrations that provide a warning. For example, an audio warning may be generated by portions of eyewear located proximate to the temples of a technician and in particular the ends of the temples. In further embodiments, the eyewear comprises smart safety glasses with visual, audio or vibratory warnings or any combination thereof. In some embodiments, Bluetooth technology is utilized, wherein the technician wears a base station in communication with wearable devices such as hats, helmets, gloves, glasses, vests, etc. that implement proximity detectors. In this embodiment, equipping the technician with the first proximity detector comprises directing the technician to wear an article of clothing that includes/is integrated with the first proximity detector (e.g., via a sign or procedure). In this embodiment, proximity detector 300 also includes battery 370 and sensor 380. Sensor 380 detects a battery level (e.g., by measuring voltage at battery 370). Sensor 380 may report this battery level to controller 310. If the battery level is below a desired value, then controller 310 may generate a battery level warning via speaker 350 and/or vibration generator 360. Proximity detector 300 may further include a button 390. Pressing button 390 may operate the first proximity detector to issue a command to remotely halt machines 140 that are within the same cell as the technician 150.

FIG. 3 further depicts an Inertial Measurement Unit (IMU 395) which is capable of detecting acceleration indicative of motions of the proximity detector 300. By integrating these accelerations over a period of time (e.g., once per second, every fraction of a second, at multiple kilohertz, etc.), movement of a technician can be ascertained. This information may be utilized to validate or complement location data determined via sensors 120. For example, the IMU 395 may have a sampling rate that is substantially higher than that of the sensors 120. Thus, IMU 395 may be utilized to detect rapid motions of the technicians in between UWB pulses received/transmitted by the sensors 120. This helps to accurately detect the position of a technician, even when the technician moves quickly in between pulses of detection for sensors 120.

In one embodiment, the IMU 395 provides positional updates to controller 112, while in further embodiments, the IMU 395 receives information indicating a location of proximity detector 300 as well as a proximity detector of a machine. Controller 310 then internally updates its position based on input from the IMU 395 during lulls in which sensors 120 are not operated (e.g., for a fraction of a second). If input from the IMU 395 indicates that the proximity detector 300 has moved closer than a threshold distance (e.g., D2 of FIGS. 4-6) during a lull, the controller 310 generates a warning as discussed above in order to warn a technician wearing the proximity detector 300.

In further embodiments, battery level information may be reported to proximity reporting server 110. Each cell may be associated with a predetermined battery level. This may be the battery level desired in order to ensure that proximity detector 300 continues to operate while a technician performs inspections or maintenance within that cell. Upon entry to the cell (e.g., as determined based on a triangulated location of the proximity detector 300), controller 112 may compare the current battery level to that desired for the cell. Controller 112 may further direct the proximity detector 300 to generate a warning if the battery level is below the predetermined battery level when the technician attempts to enter the cell. Proximity reporting server 110 may further estimate a period of time during which a technician is expected to remain in the cell 132 that they currently occupy, and instruct proximity detector 300 to generate a battery level warning if the battery level drops below a battery level expected at this point in time during the inspection or maintenance process.

In still further embodiments, proximity reporting server 110 may determine that a proximity detector has not transmitted a signal for longer than a predefined duration (e.g., one second, ten seconds, thirty seconds, one minute, etc.). In response to this determination, proximity reporting server 110 may transmit a halt instruction to all machines located in the cell that the proximity detector was last detected in. This ensures safety in the event of an unexpected power loss to a proximity detector, and enables the technician to safely exit the cell even in the event of total battery loss or device failure.

Additional proximity detectors, such as those disposed at a machine 140, may be equipped without vibration generators, batteries, battery sensors, and/or speakers. Such proximity sensors may be directly attached to a power source of the machine that they are attached to, and may have controllers which directly communicate with a controller of the machine 140 to which they are mounted.

FIGS. 4-6 depict distances between proximity detectors in an illustrative embodiment. Assume, for this embodiment, that proximity detector 410 is located at a technician who is moving within a cell. The technician is moving towards a proximity detector 420 disposed at a first machine, and a proximity detector 430 disposed at a second machine as shown in FIG. 4. The machines to which proximity detectors 420 and 430 are attached are also moving, and in different directions. As the technician and the machines move, the distance between proximity detector 410 and proximity detectors 420 and 430 decreases, until proximity detector 420 is within a distance D2, as shown in FIG. 5. This causes the proximity detector 410 to emit a warning. In FIG. 6, the technician and machines have continued to move, bringing proximity detector 420 within a distance D1, and bringing proximity detector 430 within a distance D2. The warning continues to emanate from proximity detector 410, and the machine to which proximity detector 420 is attached, is halted. Halting the machine may comprise preventing the machine from moving, deactivating the machine, causing the machine to move into a "safety" pose or other retracted state, or having the machine actively move away from the technician.

FIGS. 7-8 illustrate communications transmitted between proximity detectors and a proximity reporting server in an illustrative embodiment. FIG. 7 illustrates a communication 700 for a signal transmitted by a proximity detector. The communication may be packetized according to a well-known wireless protocol (e.g., in accordance with an IEEE 802.11 protocol, in accordance with Bluetooth, etc.) and received via sensors 120, or may otherwise be modulated to carry information. According to FIG. 7, communication 700 includes a master ID indicating the machine or person to which it is attached. Communication 700 also includes a device ID that uniquely distinguishes the proximity detector from other proximity detectors at the same person or machine. Communication 700 further reports a battery level for the proximity detector that generated the communication.

FIG. 8 depicts a communication 800 that may be provided to a proximity detector by proximity reporting server 110. In this embodiment, communication 800 comprises a notification. Communication 800 includes an identifier for the device it is directed to, an identifier for the proximity detector that it is directed to, and an instruction provided to the proximity detector. Example instructions may include a warning, an instruction to halt operations, an instruction to resume operations, and others. For example, a first notification (e.g., a notification directing the first proximity detector to issue a warning) may be provided to a proximity detector worn by a technician if a distance of a proximity detector at a machine is less than a first threshold. a second notification (e.g., a notification directing the second proximity detector to halt or shut down a machine) may be provided to the second proximity detector of the distance is less than a second threshold which is smaller than the first threshold.

Figure 9:
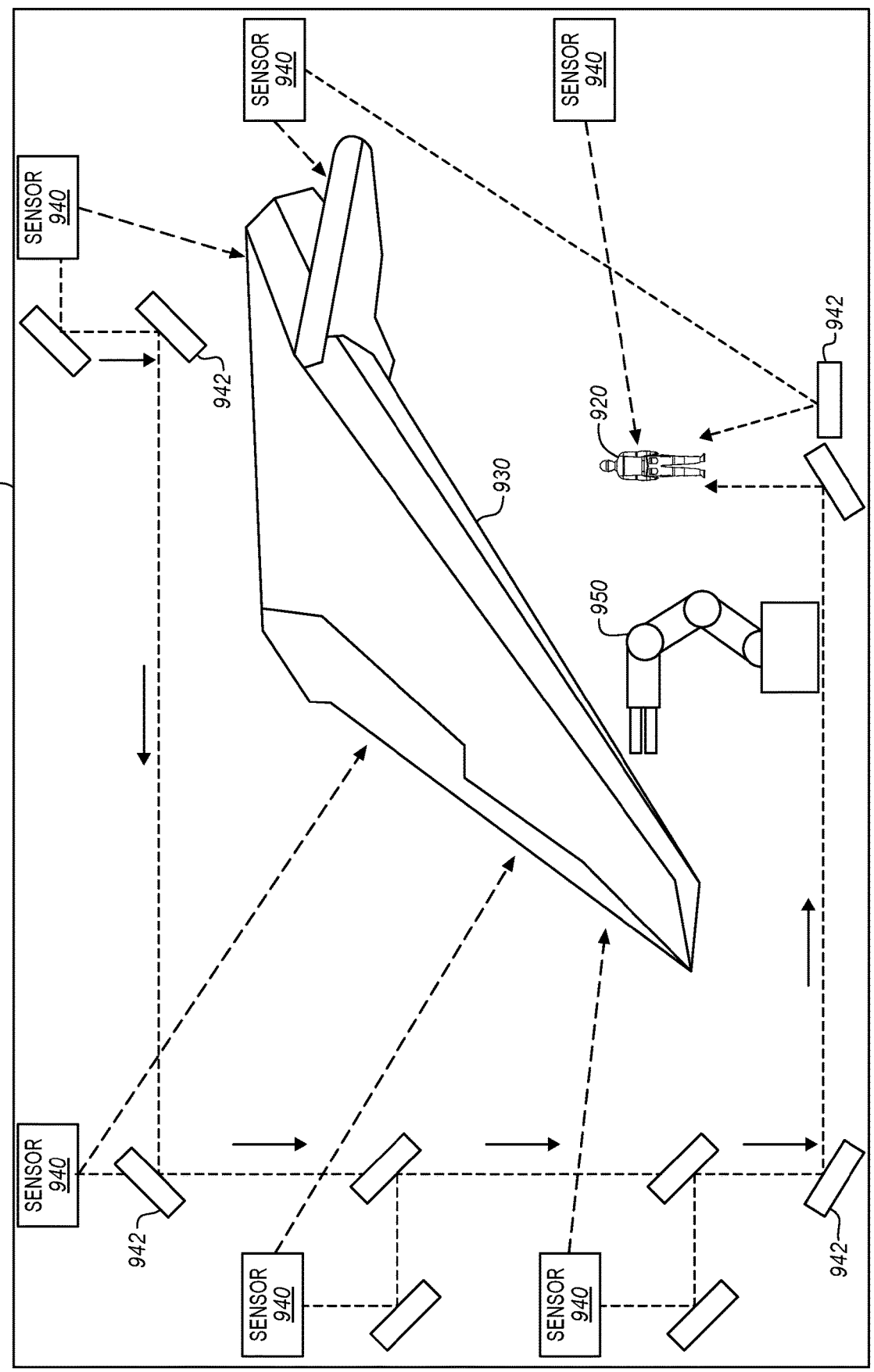
FIG. 9 depicts a system that selectively adjusts a sensing heuristic to detect the presence of a technician at a factory floor to account for the presence of obscuring parts at the factory floor in an illustrative embodiment.

FIG. 9 depicts a system that selectively adjusts a sensing heuristic to detect the presence of a technician at a factory floor to account for the presence of obscuring parts at the factory floor in an illustrative embodiment. In FIG. 9, a cell 910 includes a technician 920. Prior to the entry of a wing 930 to the cell, sensors 940 directly detect the presence of a proximity detector of the technician. However, after the wing 930 has entered the cell, the technician is no longer directly visible to all sensors from all locations. That is, not all sensors have a direct line of sight to the technician 920. Thus, the sensors 940 are operated in a mode wherein one or more of the sensors indirectly detects the presence of the technician via mirrors 942. Based on this detection scheme, a distance (e.g., D of FIG. 1) of the technician 920 to a machine 950 is determined.

Figure 10:
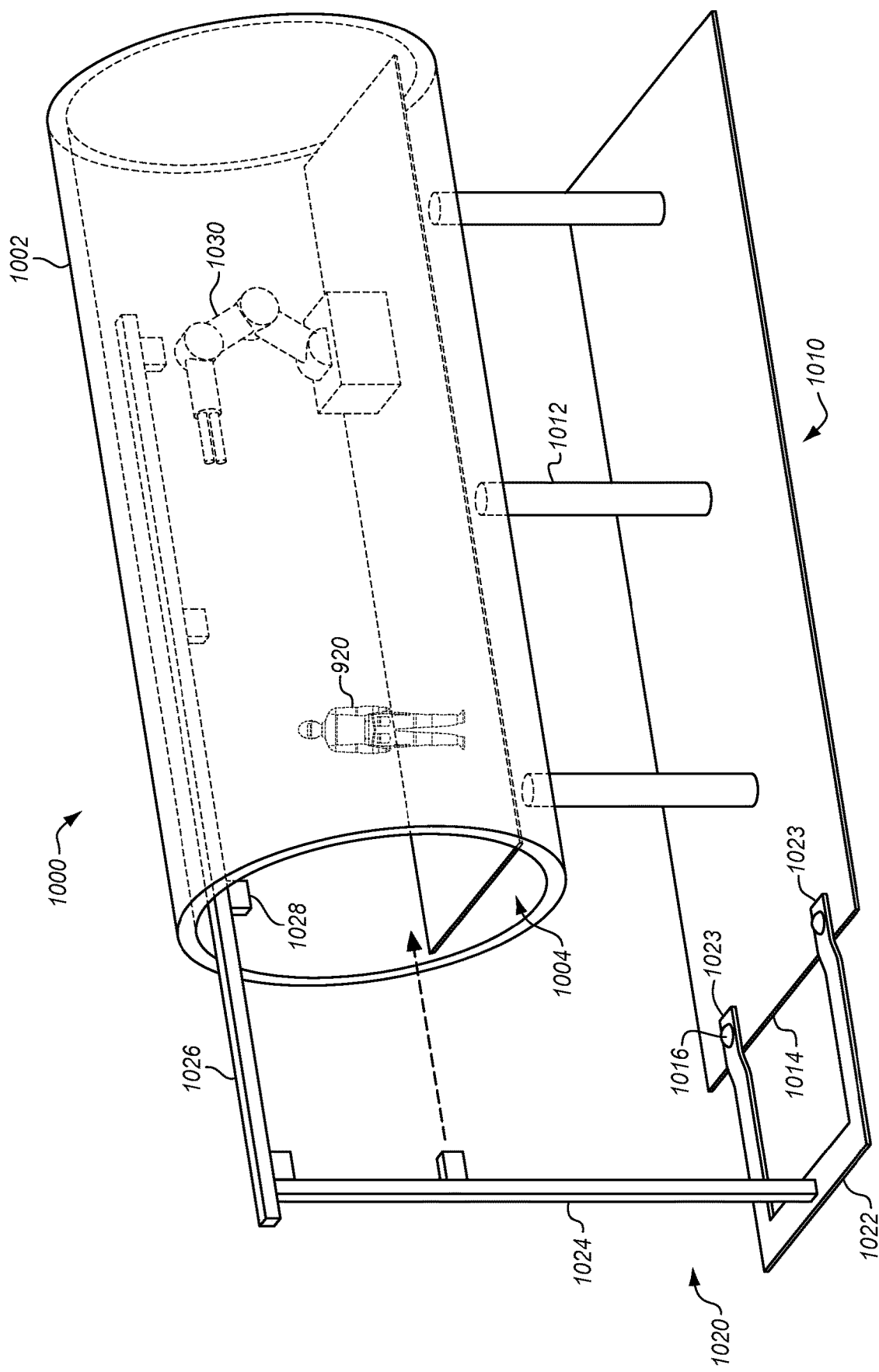
FIG. 10 depicts a bracket for inserting sensors into an interior of an obscuring part that is capable of being occupied by a technician in an illustrative embodiment.

FIG. 10 depicts a bracket 1020 for inserting sensors 1028 into an interior 1004 of an obscuring object 1000 (e.g., a section of fuselage) that is capable of being occupied by a technician 920 in an illustrative embodiment. Bracket 1020, and similar devices, may be utilized in order to enable proximity detection of a technician to machines, even while the technician is within an interior of a part being worked upon. In FIG. 10, obscuring object 1000 includes an exterior 1002 that obstructs detection of a technician (e.g., because it is opaque to wavelengths used for detection) within an interior 1004. The obscuring object 1000 is held by a cradle 1010, which includes a base 1014 and pillars 1012 that provide physical support. The base 1014 includes indexing features 1016 (e.g., cups or cones) for precisely locating the bracket 1020. Thus, when indexing features 1023 (e.g., cones or cups) are placed into position at the indexing features 1016, a position of the bracket 1020 with respect to the obscuring object 1000 is precisely known. Because a base 1022, tower 1024, and arm 1026 of the bracket 1020 are rigid, the position of sensors 1028 (e.g., UWB sensors) with respect to the obscuring object 1000 is also known. This enables the sensors 1028, disposed at/under the arm 1026 to be utilized to precisely track a technician within the interior 1004, and to determine distances between the technician and a machine 1030 that performs work on an interior of the obscuring object 1000.

Figure 11:
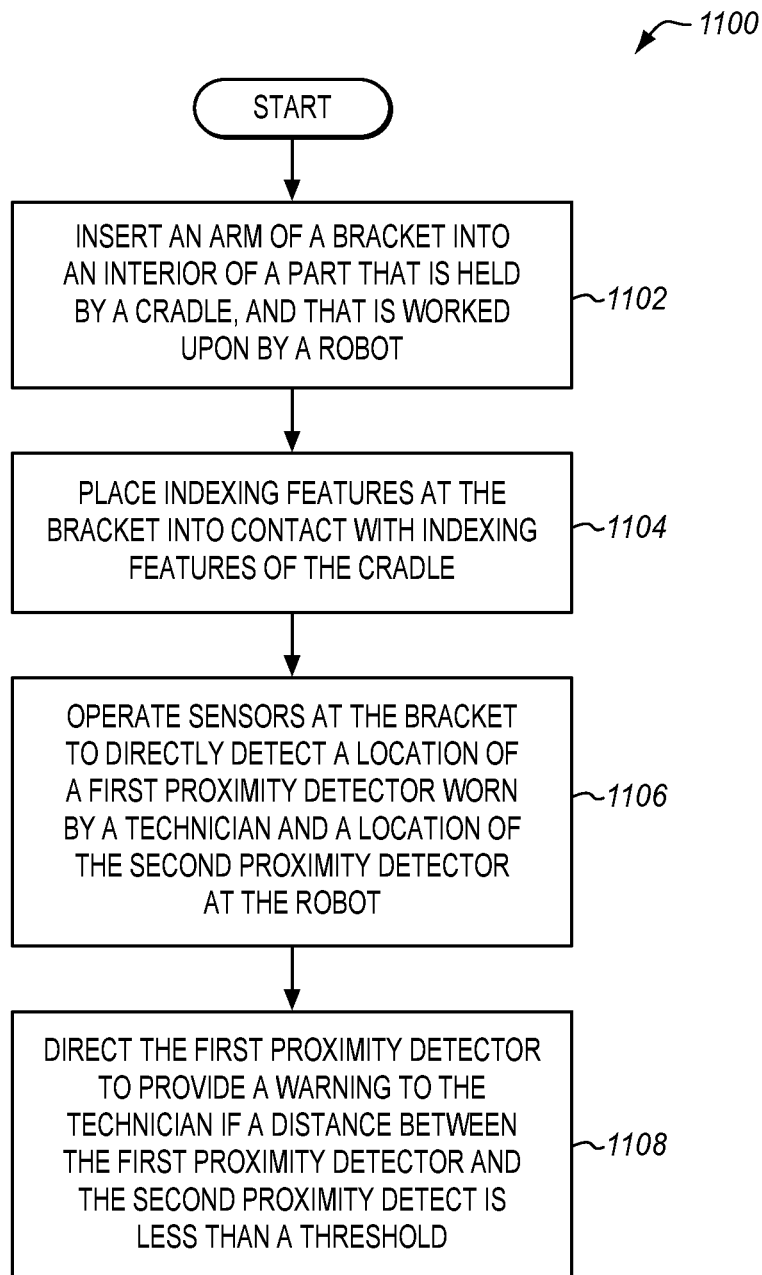
FIG. 11 is a flowchart illustrating a further method for reporting proximity in an illustrative embodiment.

FIG. 11 is a flowchart illustrating a further method 1100 for reporting proximity in an illustrative embodiment. Step 1102 includes inserting an arm of a bracket into an interior of a part that is held by a cradle, and that is worked upon by a machine. This means that each of the sensors 1028 disposed at the arm 1026 has a line of sight to the interior of the part. Step 1104 includes placing indexing features at the bracket into contact with indexing features of the cradle. This may comprise placing cones into cups. In step 1106, sensors at the bracket are operated to directly detect a location of a first proximity detector worn by a technician and a location of the second proximity detector at the machine. In one embodiment, operating the sensors comprises receiving UWB signals from the proximity detectors. Step 1108 includes directing the first proximity detector to provide a warning to the technician if a distance between the first proximity detector and the second proximity detector is less than a threshold. In one embodiment, this comprises initiating a transmission from a proximity reporting server to a first proximity detector at the technician (e.g., via sensors 1024-1028) if the distanced is less than a first threshold. In response to this transmission, the first proximity detector provides a warning to the technician. If the distances is less than a second threshold which is smaller than the first threshold, the proximity reporting server initiates a transmission to the machine that halts the machine.

Method 1100 provides a technical benefit over prior techniques by enabling the proximity of a technician to a machine to be tracked, even when the technician is hidden within an interior of a part being worked upon.

EXAMPLES

In the following examples, additional processes, systems, and methods are described in the context of proximity reporting system.

Figure 12:
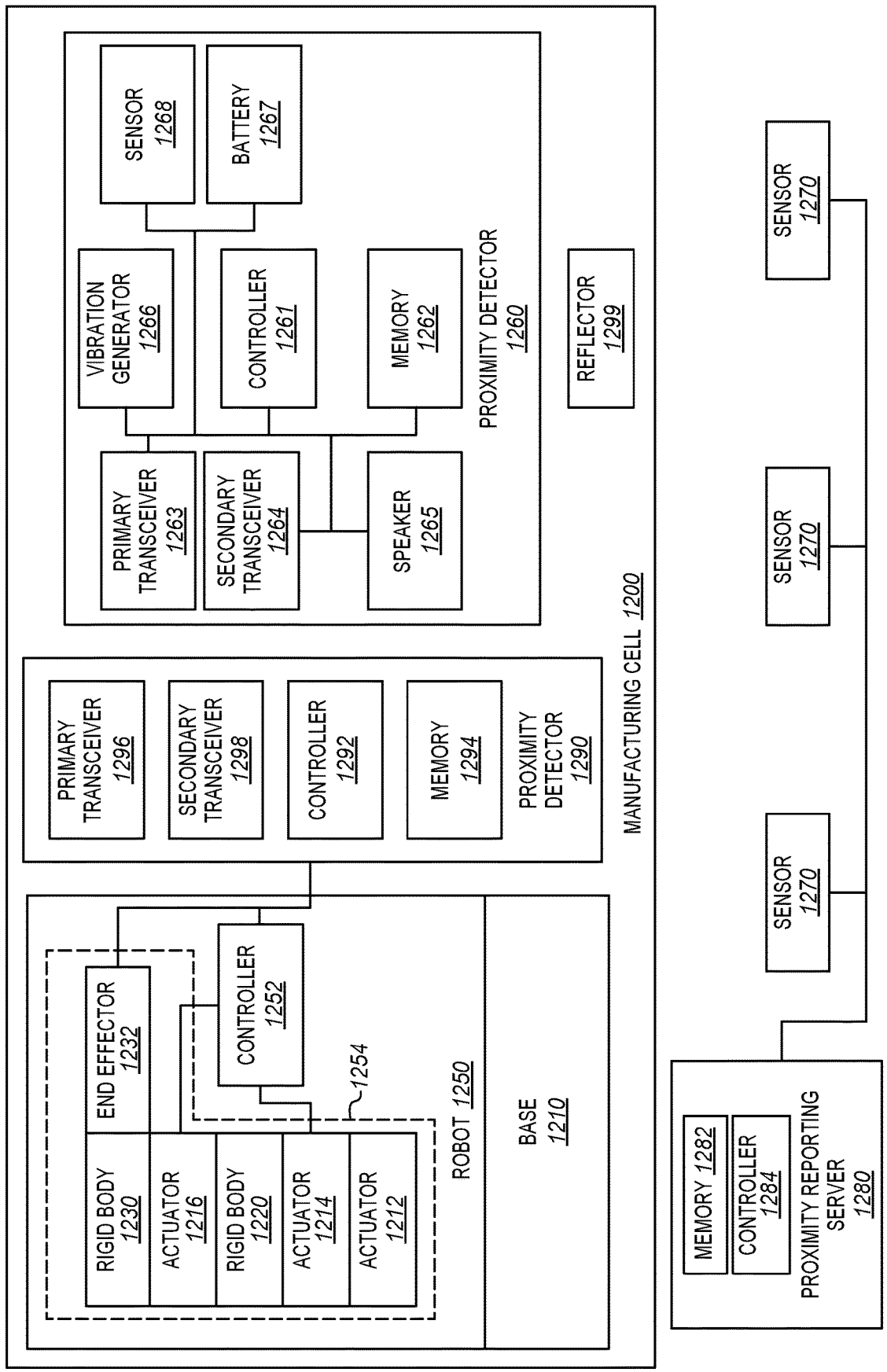
FIG. 12 is a block diagram of a proximity reporting system in an illustrative embodiment.

FIG. 12 is a block diagram of a proximity reporting system in an illustrative embodiment. As shown in FIG. 12, manufacturing cell 1200 includes machine 1250. Machine 1250 is attached to base 1210, and includes controller 1252. Controller 1252 directs the operations of actuators 1212, 1214, and 1216, in order to reposition the rigid bodies 1220 and 1230 (e.g., in accordance with a Numerical Control (NC) program). This also repositions the end effector 1232. The combination of actuators 1212, 1214, and 1216, and rigid bodies 1220 and 1230 (including end effector 1232) form kinematic chain 1254.

Proximity detector 1290 is mounted to machine 1250, and is coupled for communication with controller 1252. Proximity detector 1290 includes controller 1292, which generates signals for processing by proximity reporting server 1280, and further includes memory 1294. Signals are transmitted via primary transceiver 1296 and/or secondary transceiver 1298 in order to provide redundancy and reduce the potential for the signal to be interfered with. Signals transmitted from proximity detector 1290 are received at sensors 1270.

Proximity server 1280 comprises memory 1282 and controller 1284. Memory 1282 stores data indicating a first threshold and a second threshold that is smaller than the first threshold. Controller 1284 determines whether an obscuring object is present within a cell of an assembly environment, and operates sensors at the cell to indirectly detect a location of a first proximity detector and a location of a second proximity detector via mirrors when an obscuring object is present. The controller 1284 determines a distance between a first proximity detector and a second proximity detector, provides a notification to the first proximity detector if the distance is less than the first threshold, and provides a notification to the second proximity detector if the distance is less than the second threshold.

Proximity detector 1260 is worn by a technician within manufacturing cell 1200. Proximity detector 1260 includes controller 1261, which generates signals, memory 1262, which stores instructions for generating and interpreting signals. Proximity detector 1260 further includes primary transceiver 1263 and secondary transceiver 1264. Speaker 1265 and vibration generator 1266 are used to generate warnings for the technician, and battery 1267 provides mobile power. Sensor 1268 reports battery levels to controller 1261 for interpretation. A reflector/mirror 1299 is also depicted, which is selectively utilized when a sensing heuristic of a sensor 1270 is altered to account for the presence of an obscuring object.

Figure 13:
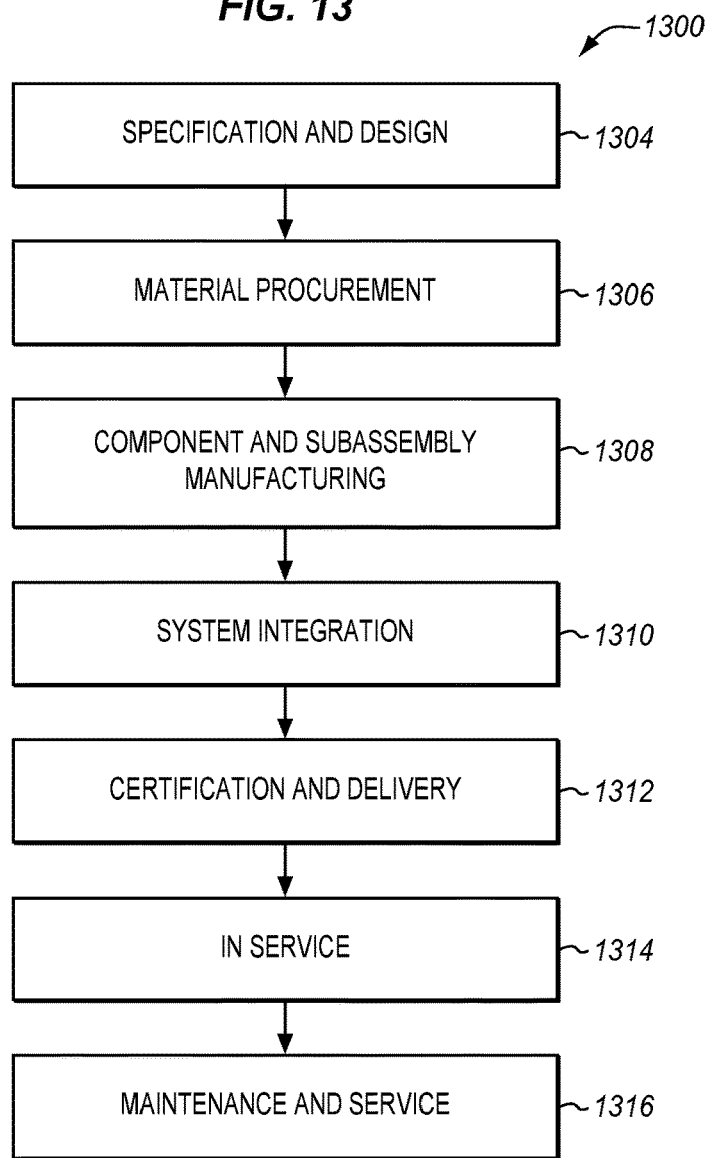
FIG. 13 is a flow diagram of aircraft production and service methodology in an illustrative embodiment.
Figure 14:
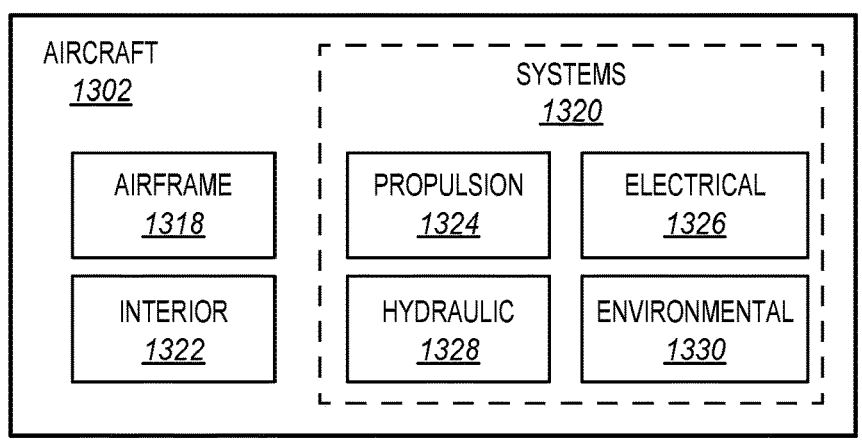
FIG. 14 is a block diagram of an aircraft in an illustrative embodiment.

Referring more particularly to the drawings, embodiments of the disclosure may be described in the context of aircraft manufacturing and service in method 1300 as shown in FIG. 13 and an aircraft 1302 as shown in FIG. 14. During pre-production, method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine work in maintenance and service 1316 (which may also include modification, reconfiguration, refurbishment, and so on). Apparatus and methods embodied herein may be employed during any one or more suitable stages of the production and service described in method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion system 1324, electrical system 1326, hydraulic system 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by method 1300 may include an airframe 1318 with a plurality of systems 1320 and an interior 1322. Examples of systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1300. For example, components or subassemblies corresponding to component and subassembly manufacturing 1308 may be fabricated or manufactured in a manner similar to components or subassemblies produced while the aircraft 1302 is in service. Also, one or more apparatus embodiments, method embodiments, or a combination thereof may be utilized during the subassembly manufacturing 1308 and system integration 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation during the maintenance and service 1316. For example, the techniques and systems described herein may be used for material procurement 1306, component and subassembly manufacturing 1308, system integration 1310, service 1314, and/or maintenance and service 1316, and/or may be used for airframe 1318 and/or interior 1322. These techniques and systems may even be utilized for systems 1320, including, for example, propulsion system 1324, electrical system 1326, hydraulic 1328, and/or environmental system 1330.

In one embodiment, a part comprises a portion of airframe 1318, and is manufactured during component and subassembly manufacturing 1308. The part may then be assembled into an aircraft in system integration 1310, and then be utilized in service 1314 until wear renders the part unusable. Then, in maintenance and service 1316, the part may be discarded and replaced with a newly manufactured part. Inventive components and methods may be utilized throughout component and subassembly manufacturing 1308 in order to facilitate inspection and maintenance for systems that manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for reporting proximity in an assembly environment, the method comprising:
   inserting an arm of a bracket into an interior of a part that is held by a cradle, and that is worked upon by a robot;
   placing indexing features at the bracket into contact with indexing features of the cradle;
   operating sensors at the bracket to directly detect a location of a first proximity detector worn by a technician and a location of a second proximity detector at the robot; and
   directing the first proximity detector to provide a warning to the technician if a distance between the first proximity detector and the second proximity detector is less than a threshold.

2. The method of claim 1 wherein:
   the first proximity detector is integrated with an article of clothing worn by the technician.

3. The method of claim 1 wherein:
   the operating sensors comprises receiving Ultra-Wideband (UWB) signals.

4. The method of claim 1 wherein:
   the operating sensors comprises operating sensors disposed under the arm of the bracket.

5. The method of claim 1 wherein:
   placing the indexing features at the bracket into contact with the indexing features of the cradle comprises placing cones into cups.

6. The method of claim 1 wherein:
   the warning comprises visual and auditory stimuli.

7. The method of claim 1 further comprising:
   updating the distance based on input from an Inertial Measurement Unit (IMU) at the first proximity detector.

8. A portion of an aircraft assembled according to the method of claim 1.

9. A non-transitory computer readable medium embodying programmed instructions which, when executed by a processor, are operable for performing a method for reporting proximity in an assembly environment, the method comprising:
   inserting an arm of a bracket into an interior of a part that is held by a cradle, and that is worked upon by a robot;
   placing indexing features at the bracket into contact with indexing features of the cradle;

operating sensors at the bracket to directly detect a location of a first proximity detector worn by a technician and a location of a second proximity detector at the robot; and directing the first proximity detector to provide a warning to the technician if a distance between the first proximity detector and the second proximity detector is less than a threshold.

10. The medium of claim 9 wherein:
the first proximity detector is integrated with an article of clothing worn by the technician.

11. The medium of claim 9 wherein:
the operating sensors comprises receiving Ultra-Wideband (UWB) signals.

12. The medium of claim 9 wherein:
the operating sensors comprises operating sensors disposed under the arm of the bracket.

13. The medium of claim 9 wherein:
placing the indexing features at the bracket into contact with the indexing features of the cradle comprises placing cones into cups.

14. The medium of claim 9 wherein:
the warning comprises visual and auditory stimuli.

15. The medium of claim 9 further comprising:
updating the distance based on input from an Inertial Measurement Unit (IMU) at the first proximity detector.

16. A portion of an aircraft assembled according to the method defined by the instructions stored on the computer readable medium of claim 9.

17. A system for proximity reporting in an assembly environment, the system comprising:

a first proximity detector that is wearable;

a second proximity detector that is disposed at a robot in a cell of the assembly environment;

a cradle that holds a part having an interior, the cradle including indexing features; and a bracket comprising:
a base having indexing features that mate with the indexing features of the cradle;
an arm inserted into the interior of the part; and
multiple sensors disposed at the arm.

18. The system of claim 17 wherein:
the sensors comprise Ultra-Wideband (UWB) sensors.

19. The system of claim 17 further comprising:
a proximity server that determines a distance between the first proximity detector and the second proximity detector, provides a notification to the first proximity detector if the distance is less than a first threshold, and provides a notification to the second proximity detector if the distance is less than a second threshold.

20. The system of claim 17 wherein:
the part comprises a section of fuselage for an aircraft.

21. The system of claim 17 wherein:
each of the sensors disposed at the arm has a line of sight to the interior of the part.

22. The system of claim 17 wherein:
the indexing features at the bracket and the indexing features of the cradle are selected from the group consisting of: cups and cones.

23. Fabricating a portion of an aircraft using the system of claim 17.

* * * * *